Jan. 6, 1953  C. W. WALZ ET AL  2,624,547
WINCH FOR TRAILERS
Filed July 30, 1945  3 Sheets-Sheet 1

INVENTOR.
CLAUDE W. WALZ
JAMES H. CLARK
ATTORNEYS.

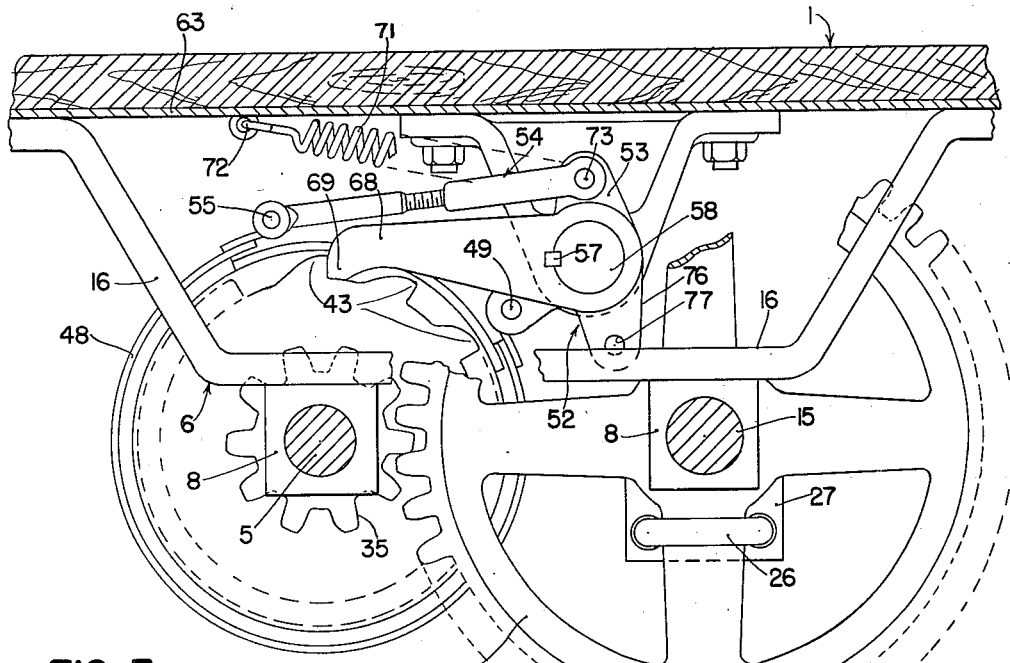

Jan. 6, 1953  C. W. WALZ ET AL  2,624,547
WINCH FOR TRAILERS
Filed July 30, 1945  3 Sheets-Sheet 3

INVENTOR.
CLAUDE W. WALZ
JAMES H. CLARK
BY
ATTORNEYS.

WITNESS

Patented Jan. 6, 1953

2,624,547

UNITED STATES PATENT OFFICE 2,624,547

WINCH FOR TRAILERS

Claude W. Walz, Rock Island, and James H. Clark, Moline, Ill., assignors to Deere & Company, Moline, Ill., a corporation of Illinois Application July 30, 1945, Serial No. 607,856

7 Claims. (Cl. 254—187)

The present invention relates generally to farm equipment and the like and is more particularly concerned with a new and improved loading winch particularly adapted for use on a tilting platform trailer to facilitate hauling implements and the like up onto the platform of the trailer easily, quickly and safely.

The object and general nature of the present invention is the provision of a new and improved loading winch for trailers and the like and in which is incorporated new and improved control mechanism which facilitates both the loading and unloading. More particularly, it is a feature of this invention to provide a new and improved winch construction having a detachable crank which may be placed in one position for loading light loads, in another position for loading heavy loads, and in a third position for controlling the unloading of implements and the like from the trailer. Further, it is a feature of this invention to provide a winch in which a loading cable may readily and conveniently be unwound from the cable reel so as to materially facilitate paying out sufficient cable to facilitate attaching it to the implement or the like to be loaded onto the trailer.

These and other objects and advantages of the present invention will be apparent to those skilled in the art after a consideration of the following detailed description, taken in conjunction with the accompanying drawings.

In the drawings:

Figure 2 is a side view, showing the laterally outer side of the winch unit and corresponding generally to a view taken along the line 2—2 of Figure 1.

Figure 3 is a side view showing the other side of the winch unit, corresponding generally to a view taken along the line 3—3 of Figure 1.

Figure 1:
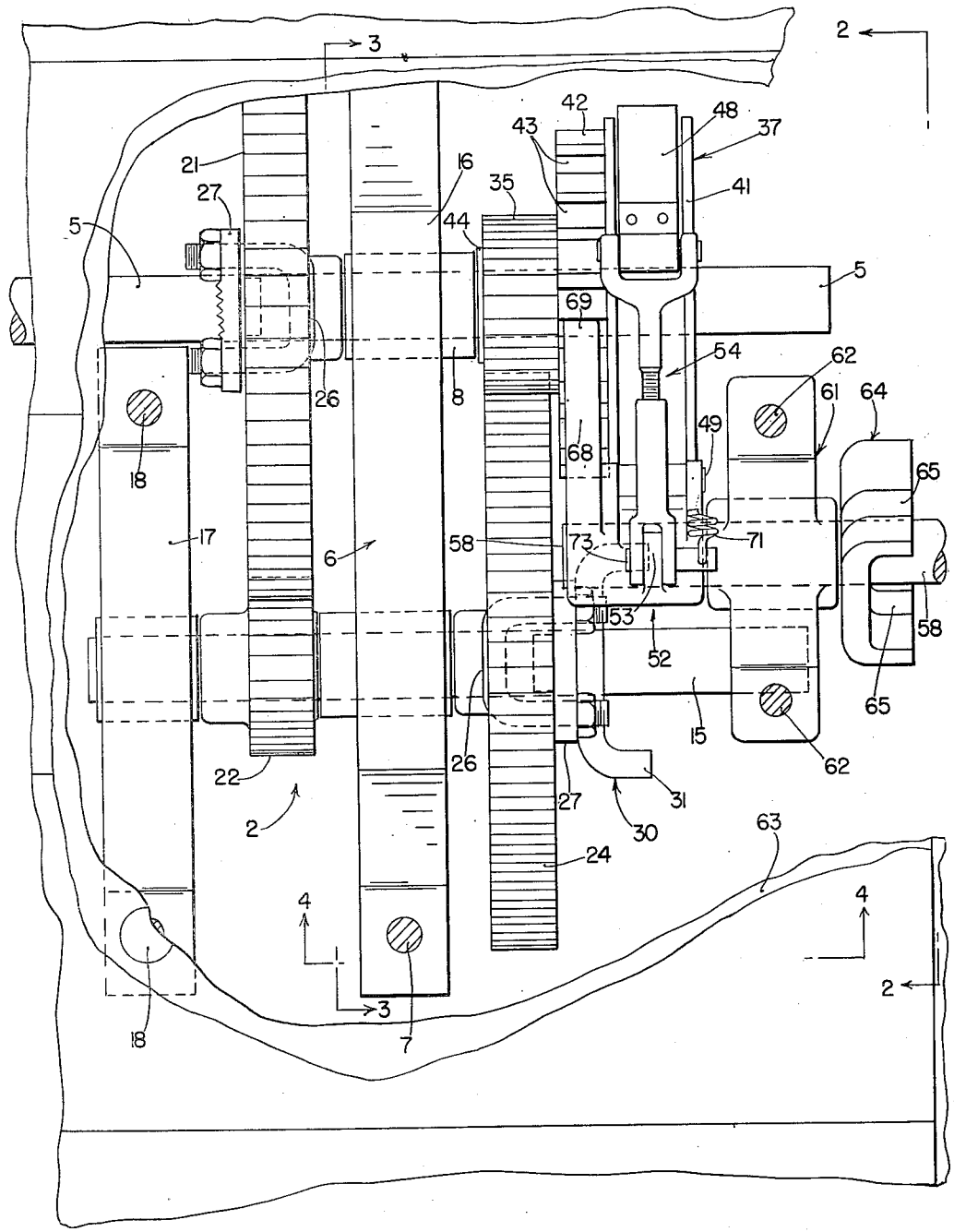
Figure 1 is a top view, showing the new and improved winch construction attached to the bottom of a farm trailer.
Figure 4:
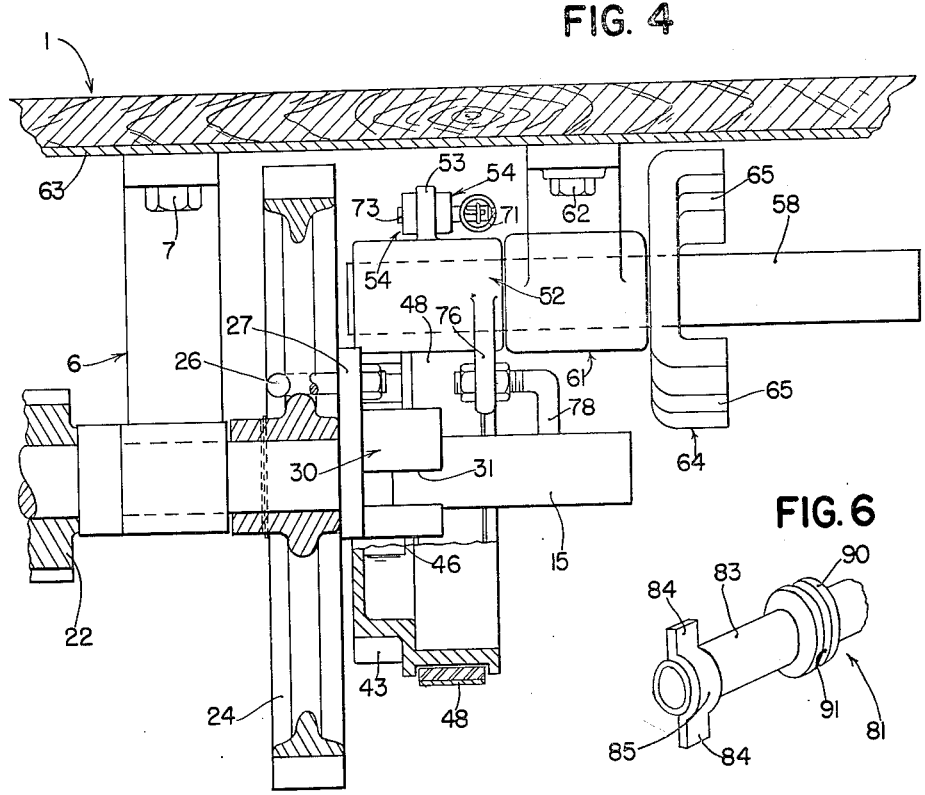
Figure 4 is an end view of the winch unit, taken generally along the line 4—4 of Figure 1.
Figure 6:
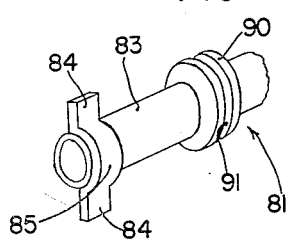
Figure 6 is a fragmentary view of the inner end of the operating crank.
Figure 5:
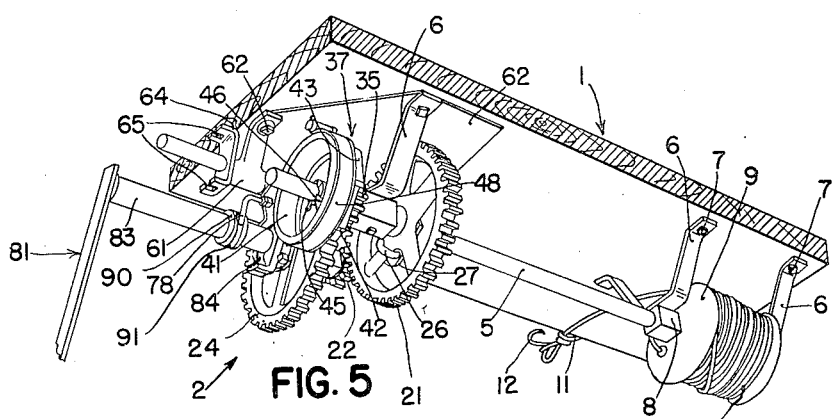
Figure 5 is a perspective view of the winch mounted on the underside of a trailer.

Referring now to the drawings, particularly Figures 1 and 2, the platform of the trailer is indicated in its entirety by the reference numeral 1, and fixed in a suitable location on the bottom side of the platform 1 is the winch unit, indicated in its entirety by the reference numeral 2, with which the present invention is particularly concerned. The trailer, which has not been shown in detail since the particular construction of the trailer per se does not form a part of the present invention, is of conventional construction and embodies the platform 1 mounted upon two supporting wheel units and is equipped with a pivoted hitch by means of which the platform may be tilted for loading or unloading. The platform is adapted to receive bulky machines, such as tractors with integrally mounted equipment, manure spreaders, grain drills and other farm equipment. The hitch is adapted to be connected to a farm truck or other automotive vehicle. When the implements are to be loaded or unloaded, the hitch is pivoted so as to tilt the platform downwardly and rearwardly, so as to facilitate moving the load onto the platform. In the case of self-propelled machines, they may, of course, be driven directly onto the platform, but in the case of other implements not self-powered, it is desirable to provide the trailer with some form of loading winch, usually operated by hand, for hauling the implements or the like up onto the platform to which they may subsequently be secured for transit. Generally, a winch of this type is mounted on the underside of the platform and includes a reel and a cable which is extended to the front end of the platform, passed over a pulley at the front end and then over the top and rearwardly of the platform. The cable is of considerable length so that after the platform is tilted downwardly at the rear end, the cable may be payed out with sufficient length to facilitate hooking the rear end of the cable onto the load and then operating the winch to haul the load up onto the platform. It is with such a winch construction that the present invention is particularly concerned.

As best shown in Figures 1 and 2, the winch unit 2 includes a reel shaft 5 connected to the bottom of the platform by a plurality of bearing brackets 6, which may be bolted, as at 7, to the platform 1, each of which includes suitable bearing means 8 in which the shaft 5 is supported for rotation. To the laterally inner end of the reel shaft 5 a reel 9 is fixed, and the latter receives a cable 10, one end of which is fixed to the reel in any suitable manner while the other end 11 is provided with a hook 12 or other suitable means for engagement with the load to be brought up onto the platform 2. A jackshaft 15 is supported on an extended portion 16 of the laterally outer bracket 6 and on an auxiliary bracket 17 bolted to the under side of the platform 2, as at 18. Both the reel shaft 5 and the jackshaft 15 extend laterally outwardly toward the adjacent edge of the platform 2, as will be referred to below.

A gear 21 is fixed to the reel shaft 5 adjacent the laterally outer bearing bracket 6 and meshes with a pinion 22 that is fixed to the laterally inner end portion of the jackshaft 15. A gear 24 is fixed to the jackshaft 15 laterally outwardly of the bearing bracket section 16. Preferably, each of the gears 21 and 24 is fixed to its shaft by means of a U-bolt 26 which embraces one of the spokes of the gear and passes through a plate 27 that is fixed, as by welding or the like, to the associated shaft. Adjacent the gear 24 is an operating yoke 30 which is provided with bifurcated end portions 31 to which reference will be made below. The yoke 30 is secured by welding to the plate 27 or to the shaft 15, as desired.

Meshing with the large gear 24 is the pinion section 35 of a combined brake drum, ratchet and pinion member 37 which is mounted for rotation on the laterally outer end portion of the reel shaft 5. The member 37 comprises a brake drum section 41, a ratchet section 42 having teeth 43, and a pinion section 35 just mentioned. The latter may be formed integrally with the other sections, or separately therefrom, as desired. The unit 37 is held against lateral displacement on the outer end of the shaft 5 by means of a snap ring 44 at the inner side and a washer and cotter 45 at the outer side. The brake drum section 41 is provided with driving lugs 46.

Disposed about the brake drum section 41 is a brake band 48, one end of which is anchored, as at 49, to an arm 51 that forms a part of a bell crank indicated in its entirety by the reference numeral 52. The latter includes a second arm 53 which is connected by an adjustable link 54 with the other end of the brake drum, as at 55. The arms 51 and 53 are so disposed with respect to one another that when the bell crank 52 is swung in one direction it tightens the brake band 48 about the brake drum 41. The bell crank 52 is fixed, as by a key 57, to a shaft 58 that extends through a bearing bracket member 61, which is bolted, as at 62, to the bottom of the platform. If desired, and for convenience of manufacture and assembly, the several bearing brackets 16, 17 and 61 may be fastened to a mounting plate 63, thereby preserving the proper alignment of the bearings. The shaft 58 extends laterally outwardly beyond the bearing bracket 61 and receives an operating yoke 64, having bifurcated ends, as at 65. Secured to or forming a part of the bell crank 52 is a pawl 68 which has a nose section 69 adapted to engage any one of the ratchet teeth 43 on the ratchet section 42. The bell crank arms 51 and 53 and the pawl section 68 are so disposed that the brake band 48 is released when the pawl 68 engages the ratchet section 42 and does not engage the brake drum 41 until after the nose portion 69 and the pawl 68 has been moved away from and out of contact with the teeth on the ratchet 42. A spring 71 is connected at one end, as at 72, to the platform or to the mounting plate 63, as by a cotter, and at the other end the spring 71 is connected, as by a cotter, to the pin 73 that forms the pivot connection between the adjusting link 54 and the bell crank arm 53. The bell crank 52 is also provided with an extension 76 which is apertured, as at 77, to receive an adjustable arm 78. Preferably, the latter is in the form of a rod bent at one end and threaded to receive a pair of lock nuts so that by passing the threaded end through the opening 77 in the bell crank extension arm 76 and then tightening the nuts, the part 78 may be held in different positions of adjustment.

For operating and controlling the winch, we provide a crank member 81 having a handle section at its outer end and fixed at its inner end to a sleeve section 83. At the inner end of the sleeve section 83 a pair of lugs 84 are fixed thereto. Preferably, the lugs 84 are formed by bending a strap member 85 so as to partially embrace the inner end of the sleeve 83 and then welding the strap member thereto with its ends extending radially outwardly so as to form the lugs 84. The latter are so constructed and arranged to enter the bifurcations in the operating yoke sections 30, 46 and 64.

The operation of the winch construction as described above is substantially as follows. Assuming that the trailer has been driven to a point adjacent the implement or other part to be loaded onto the trailer, and that for convenience in transporting the trailer thereto, the cable 10 has been completely wound up on the reel 9, the operator will first mount the handle member 81 on the outer end of the jackshaft 15. A collar 90 having a peripheral groove 91 therein is loosely mounted on the sleeve 83 between the crank section thereof and the lugs 84 so that when the sleeve section 83 is mounted on the laterally outer end of the jackshaft 15, the rod extension 78 of the bell crank 52 may be actuated by hand to disengage the pawl 58 from the ratchet section while leaving the brake band 48 still disengaged from the brake drum. The collar 90 may then be slid along the sleeve 83 into a position behind the rod member 78 so that the collar 90 and the rod member 78 hold the bell crank 52 in the position just mentioned, namely, releasing the pawl but not engaging the brake band. The disposition of the rod member 78 in the groove 91 insures that the collar 90 will not become accidentally displaced. The handle member 81 may then be turned in a direction to unwind the cable 10 from the reel 9. This will permit the outer end 11 of the cable to be drawn rearwardly in a position where it may be engaged with the load. It will be understood that it is easier in this type of winch to unwind the reel by using the crank rather than by merely exerting a pull on the cable end 11, for the reason that the gearing described above imposes a load making the unwinding of the cable by hand in the manner just described somewhat difficult. It may also be mentioned at this point that the crank member 81 may be mounted in this position for pulling up a fairly light load. In this event, however, the collar 90 is not engaged with the rod member 78 since it is desirable to have the pawl 68 function, even though it is only a light load that is being hauled up onto the platform.

For hauling a fairly heavy load up onto the platform, after the cable 10 has been extended back to the load, as described above, the crank member 81 is removed from the outer end of the jackshaft 15 and placed on the outer end of the reel shaft 5, with one of the lugs 84 engaging the driving lug 46 on the brake drum. Two or more driving lugs 46 may be provided if desired. With the crank member in this position, the brake band is free of the brake drum but the pawl 68 is in a position engaging the ratchet section 42. With the crank member 81 in the position just described, the latter is turned in the proper direction, and thus drives the first pinion section 35. The latter drives the large gear 24 which is fixed to the jackshaft 15 to which the second pinion 22 is fixed. The rotation of the latter pinion 22 therefore drives the large gear 21 on the reel shaft 5, this affording a double reduction and providing ample power for hauling relatively heavy machines onto the platform 2. The pawl 68 operates to prevent any retrograde movement of the gearing during this action.

When the outfit has been moved to the desired location and the load is then to be removed from the trailer, the trailer platform is tilted to bring the rear end down to the ground and the crank member 81 is then mounted on the stub shaft 59, with the lugs 84 engaging in the bifurcated portions 65 of the operating yoke 64. This places the crank member 81 in direct connection with the bell crank 52. Therefore, by rocking the latter in one direction the pawl 68 is disengaged from the ratchet teeth 43, permitting the load to run down to the ground by gravity, but continued movement of the bell crank 52 in the same direction applies the brake band 48 with more or less force, whereby the operator has complete and ratchet control of the descent of the load down the tilted platform. At any moment when the operator releases his hold on the crank 81, the spring 71 acts immediately to reengage the pawl 68 with the ratchet teeth 43 and thus prevent further lowering of the load. In releasing the pawl 68 and in applying the brake band 48 to the brake drum 41, the operator moves the handle 81 against the tension of the spring 71.

While we have shown and described above, the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A winch construction comprising a reel shaft having a reel thereon a pinion rotatably mounted on said reel shaft, a ratchet wheel fixed to said pinion, a brake drum fixed to said pinion, a pawl for controlling movement of said ratchet, a brake for controlling movement of said brake drum, gearing for driving said reel shaft from said pinion, crank-receiving means carried by said pinion, a common member for controlling said pawl and brake, crank-receiving means on said member, and a detachable crank adapted to be connected with either of said crank-receiving means for optionally rotating said pinion to drive said reel shaft and reel thereon to operate said cable or operating said brake and ratchet means for controlling the lowering of the load connected with said reel.

2. In a winch construction having a crank-receiving driving part, means for preventing movement of said driving part in one direction, said means including a spring-biased pawl having a part extending exteriorly for moving said pawl out of operative position, a winch operating crank comprising a member adapted to be mounted on said crank-receiving part, and means on said crank adapted to engage said pawl controlling part for holding said pawl out of motion-preventing position, said pawl part and said means having interlocking portions releasably engageable and held by said spring in engaged relation to prevent accidental disconnection of said means from said pawl part.

3. In a winch construction having a crank-receiving driving part and a pawl having a part extending exteriorly to provide for movement of said pawl into and out of operative and inoperative positions, a winch operating crank comprising a member adapted to be mounted on said crank-receiving part, and a shiftable collar on said crank adapted to engage said pawl controlling part, said collar having a groove adapted to receive said pawl controlling part for holding said pawl in one of its positions, said pawl part and said groove cooperating with one another to prevent accidental displacement of said collar relative to said crank.

4. An apparatus of the character described comprising a rotatable member, ratchet mechanism associated with said rotatable member for normally holding said member against rotation in one direction, said ratchet mechanism comprising a ratchet wheel fixed to rotate with said member and a pawl engageable with said ratchet wheel, a driving part detachably associated with said rotatable member and adapted to be connected therewith for rotating said member in the other direction, an extension on said pawl, a collar slidable axially on said driving part and movable into a position engaging said extension and acting to hold said pawl out of engagement with said ratchet wheel, thereby providing for movement of said rotary member by said driving part in said one direction, and means on said collar acting against said pawl extension to hold said collar in position relative thereto.

5. A winch construction comprising a reel shaft, a jackshaft, a pinion loosely mounted on said reel shaft, a gear fixed to said reel shaft, a gear and pinion fixed to said jackshaft and meshing, respectively, with said loose pinion and said reel shaft gear, a crank for operating the winch, an optional crank-receiving means on said loose pinion and on said jackshaft, whereby said crank may be connected with either said pinion or said jackshaft for rotating said reel shaft, ratchet mechanism connected with said reel shaft for normally preventing movement of the latter in one direction, said ratchet mechanism including an extension disposed adjacent said jackshaft, and means shiftably mounted on said crank and disposable, when the latter is in position on said jackshaft, in a position engaging said ratchet extension and serving to hold the latter in an inoperative position whereby said jackshaft may be rotated to rotate said reel shaft in said one direction.

6. A winch construction comprising a reel shaft, a jackshaft, a pinion loosely mounted on said reel shaft, a gear fixed to said reel shaft, a gear and pinion fixed to said jackshaft and meshing, respectively, with said loose pinion and said reel shaft gear, a part for operating the winch, an optional part-receiving means on said loose pinion and on said jackshaft, whereby said part may be connected with either said pinion or said jackshaft for rotating said reel shaft, ratchet mechanism connected with said reel shaft for normally preventing movement of the latter in one direction, said ratchet mechanism including an extension disposed adjacent said jackshaft, and means on said part and disposable, when the latter is in position on said jackshaft, in a position engaging said ratchet extension and serving to hold the latter in an inoperative position whereby said jackshaft may be rotated to rotate said reel shaft in said one direction.

7. A winch comprising a reel shaft, gearing for driving said reel shaft including a driving pinion rotatably mounted on said reel shaft, a jackshaft, a gear fixed to said jackshaft and meshing with said pinion, a pinion on said jackshaft, and a gear fixed to said reel shaft and meshing with said last named pinion, control means therefor comprising a ratchet and a brake drum, both fixed to said driving pinion, a relatively stationary pawl engageable with said ratchet to prevent rotation of said pinion in one direction, a cooperating brake member for said brake drum, actuating means interconnected with both said pawl and said brake member for simultaneously releasing said pawl and operating said brake member to control retrograde movement of said pinion and the associated reel shaft, and a common operating member engageable with said driving pinion or said actuating means, optionally.

CLAUDE W. WALZ.
JAMES H. CLARK.

REFERENCES CITED

The following references are of record in the file of this patent:

UNITED STATES PATENTS

| Number | Name | Date |
|---|---|---|
| 602,145 | Simpson | Apr. 12, 1898 |
| 747,401 | Foltz | Dec. 22, 1903 |
| 834,151 | Monahan | Oct. 23, 1906 |
| 1,044,008 | Boehck | Nov. 12, 1912 |
| 1,168,716 | Farrell | Jan. 18, 1916 |
| 1,261,192 | Berkel | Apr. 2, 1918 |
| 1,288,708 | Sharp | Dec. 24, 1918 |
| 1,608,538 | Wehmeier | Nov. 30, 1926 |
| 1,913,439 | Francis | June 13, 1933 |
| 1,980,686 | Kinsman | Nov. 13, 1934 |
| 2,042,674 | Martin | June 2, 1936 |

FOREIGN PATENTS

| Number | Country | Date |
|---|---|---|
| 4,465 | Great Britain | of 1907 |
| 9,895 | Great Britain | of 1898 |
| 15,366 | Germany | Sept. 21, 1881 |